Figure 1:
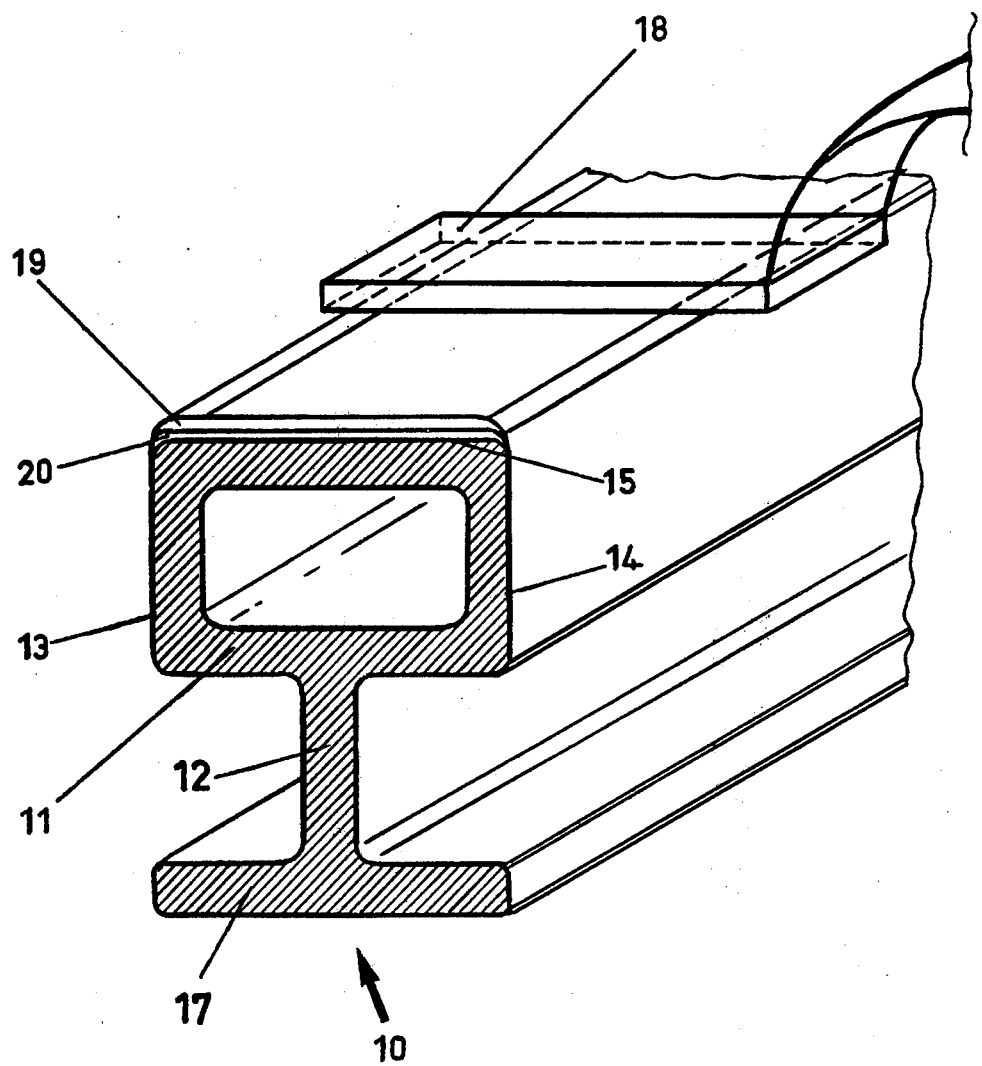

United States Patent [19]
Kugler et al.

[11] 4,014,417
[45] Mar. 29, 1977

[54] CONDUCTOR RAIL

[75] Inventors: Tibor Kugler, Thayngen; Hans Wolfhart Rieger, Beringen, both of Switzerland

[73] Assignee: Swiss Aluminium Ltd., Neuhausen am Rheinfall, Switzerland

[22] Filed: Aug. 7, 1974

[21] Appl. No.: 495,435

Related U.S. Application Data

[62] Division of Ser. No. 275,519, July 27, 1972, Pat. No. 3,873,577.

[30] Foreign Application Priority Data

July 29, 1971 Switzerland .................... 11215/71
Sept. 22, 1971 Germany ....................... 2147410

[52] U.S. Cl. .................. 191/29 DM; 29/196.2; 238/122; 427/34
[51] Int. Cl.² ..................................... B32B 15/18
[58] Field of Search ................ 238/122, 143, 148; 191/29 DM; 427/34; 29/196.2

[56] References Cited

UNITED STATES PATENTS

| | | | |
|---|---|---|---|
| 2,735,170 | 2/1956 | Moffatt | 29/196.2 |
| 3,341,669 | 9/1967 | Martin et al. | 191/29 DM |
| 3,582,575 | 6/1971 | Scofield | 191/29 DM |
| 3,602,655 | 8/1971 | Scofield et al. | 191/29 DM |
| 3,653,852 | 4/1972 | Seiler | 29/196.2 |
| 3,798,010 | 3/1974 | Sharp, Jr. et al. | 29/196.2 |

Primary Examiner—Joseph F. Peters, Jr.
Assistant Examiner—Richard A. Bertsch
Attorney, Agent, or Firm—Ernest F. Marmorek

[57] ABSTRACT

A conductor rail includes a load-bearing body of aluminum or an aluminum alloy, and a layer of steel metallically united to the body on the part of the rail to which electrical contact is to be made during use thereof, the steel layer conductively contacting the body.

2 Claims, 1 Drawing Figure

CONDUCTOR RAIL

This is a division of application Ser. No. 275,519, filed July 27, 1972, now U.S. Pat. No. 3,873,577. Reference is had to applicants' co-pending Patent Application Ser. No. 275,518, filed July 27, 1972 and their U.S. Pat. No. 3,836,394 which had been co-pending with the instant application.

The present invention relates to a method manufacture of a conductor rail consisting of a body of aluminum or of an aluminum alloy on which is a layer of a second material more resistant to wear, and an a conductor rail manufactured according to the method.

Conductor rails of this kind serve for transmission of electrical current to a consumer such as an electrically driven railway, a crane or the like, whereby the current is taken up from the rail and lead to driving means of said devices by a shoe.

Static, mechanical-technological and electrical requirements are placed on conductor rails together with others which are here of less interest. Thus, it is required of a conductor rail that, with good electrical conductivity, it should exhibit a high resistance to wear. Materials, which do justice to both requirements, eliminate themselves due to high material prices. Material prices lead the way to the manufacture of conductor rails as composite bodies, consisting of an electrically well-conducting component and a component resistant to friction wear.

Composite bodies of this kind are known, which consist of an electrically well-conducting, load-bearing body of aluminum with an insert of wear-resistant material, as for example steel. The methods of manufacture of these conductor rails are complicated and expensive by reason of a multiplicity of operational steps as for example the extrusion of the body, pressing or rolling of the wear-resistant component, uniting of these parts with subsequent straightening and checking of fitting of components relatively to one another. This kind of manufacture, which consists substantially of a cold union of pre-formed parts, introduces a metallurgical difficulty arising when materials of that kind are united by means of heat, which difficulties adversely affect the electrical conductivity. The difficulty consists, with the hot union of aluminum and iron, there forms an intermetallic layer which is brittle and electrically poorly conducting layer the does not remain constant in its thickness, because the layer exhibits an electrical transfer resistance with corresponding development of heat furthering the growth of the thickness with a subsequent steady degradation of the conductivity of the rail.

The invention provides a simplified method of manufacturing composite structures like conductor rails, eliminating the previously mentioned difficulties of hot union. According to the invention a method of manufacture of a conductor rail is provided consisting of a body of aluminum or aluminum alloy on which is a layer of a second material more resistant to wear in which method a preformed layer of a second material is brought upon the body with a partly liquified side of the layer adjacent the body with simultaneous carrying away the heat content of the layer. The formation of the intermetallic layer is avoided thereby without influence on the adhesion of the components to one another, if the deduction of the heat content of the layer of a second material more resistant to wear is performed quickly. "Quickly" here is defined by maintenance of the body temperature during the uniting process at the level before the uniting commenced.

The method according to the invention is moreover advantageously carried out in that the layer of a second material can be applied by pressing or by rolling.

If metallurgical or constructional doubts oppose the employment of a high temperature gradient for union of the components, then the method is furthermore advantageously carried out in that, before the application of the layer of a second material on the body, an intermediate layer is applied adherent to the body, and to the layer of a second material and hindering diffusion of the material of layer of a second material into the body or vice versa.

With the intermediate layer there is formed an intermetallic connection which is different from the one described relative to aluminum and steel with the state of the art. The intermediate layer is not brittle and is electrically well-conducting, if for formation of the intermediate layer there is used nickel, a nickel-aluminum alloy, tin, zinc, silver, copper or alloys of these metals, which enter into an intermetallic compound both with the wear-resistant material, i.e. steel, and also with the aluminum, but which do not exhibit the mentioned disadvantageous properties.

The thickness of the intermediate layer, which according to a development of the method according to the invention can amount to between 5 to 300 $\mu$ is determined substantially according to the requirements directed to the layer of a second material, such as life predetermined frictional operations, permissible tolerances of layer thickness. The increasing thermal stresses with rising thickness of the layer of a second material upon the intermediate layer require a reliable intermetallic connection mechanism, which is in the position to pick up these stresses and overcome them.

To simplify the expenditure on investment for carrying out the method according to the invention, it proved as advantageous, if the material of the intermediate layer is applied by flame spraying or spray welding. By flame spraying there are to be understood all kinds of applications of metal, which enable application of molten metal by means of a jet of carrier gas. In this connection, the melting can take place by chemical or electrical energy, thus in the case of the latter kind of energy by an arc or by high frequency electromagnetic waves. In the case of the invention, it is preferred that the material of the intermediate layer is melted in an arc unit, and applied by means of a plasma jet, i.e. a jet of ionised and highly heated carrier gas.

A conductor rail manufactured by the method according to the invention, consisting of a load-bearing body of aluminum or one of its alloys with a layer of a second material of more resistant to wear, whereby the layer of a second material more resistant to wear is metallically united with the body. In a further embodiment the, rail is improved therein that between the layer of a second material more resistant to wear and the body, an intermediate layer adherent to the body and the coating is provided.

The method according to the invention will be explained by way of example with reference to the conductor rail shown in FIG. 1.

FIG. 1 shows a sectional extrusion formed of aluminum, intended for forming a conductor rail 10, which consists of a box-shaped hollow section 11 and a T-section 12 connected to the box-shaped hollow section 11.

The box-shaped hollow section 11 has three sides 13, 14 and 15 suitable for connection to a current source, which each according to need carry a layer 19 of a second material more resistant to wear. The flange 17 is intended for mounting of the conductor rail 10 on both sides.

According to the shape of the pick up 18, the current flowing through the conductor rail 10 is coupled into either from the side 13, the sides 13 and 14, the side 15, or combinations of them. By reason of the frictional engagement between the pick up 18 consisting of a wear-resistant material and the conductor rail made of aluminum or its alloys, the latter would be subjected to a rapid alteration of dimensions by reason of its insufficient resistance to wear, which after short time of use would exclude a substantially air-free current transfer between conductor rail 10 and pick up 18. In contrast, the layer 19 of a second material more resistant to wear connected to the side 15 provides a remedy, while in case of different constructions of pick up 18 the sides 13 and 14 also can be coated in a similar manner. The layer 19 consists of a band-shaped or similar preformed product, which is united with the conductor rail 10 observing the following mode of operation. The pre-formed product is heated and, for attaining the object of the invention, one side of the pre-formed product, which is to come into engagement with the conductor rail 10 is heated, for example inductively, so that it changes in a thin layer into liquid or pasty condition. Whereupon at once the uniting operation is started with simultaneous rapid removal of heat inherent the product, while the thermal gradient is so maintained that the temperature of the body of the conductor rail 10 is maintained substantially as before the uniting operation. By introduction of special cooling devices on the conductor rail 10, the flow of heat from the union on the side 15 to the point of removal of the heat can, if it is advisable, be further accelerated. The union of the conductor rail 10 with the layer 19 can be advantageously carried out by pressing or in case of a continuous manufacturing process by rolling. If there are metallurgical or constructional objections opposed to the employment of a high temperature gradient, then an intermediate layer 20 can be provided. The intermediate layer 20 is applied before the union operation on the side 15 or if required on the sides 13 and 14. Good results with reference to electrical conductivity of a rail so manufactured are also yielded if the intermediate layer is applied before the pressing or rolling operation for instance upon the side of the layer 19 adjacent the body and likewise on the corresponding sides 13, 14 or 15 suited to receive the current. This can be performed, when the melting point of the materials of the intermediate layer is the same or higher than that of the material of the layer 19 of a second material more resistant to wear.

The intermediate layer 20 is applicable by flame spraying or spray welding. The application of the intermediate layer 20 by means of a plasma burner is preferred, since the material is melted and carried upon the body or one side of the layer 19 by means of a ionised carrier gas jet leaving pores assisting in absorbing stresses placed upon the layer 19.

Suitably the layer of wear-resistant material 19 is applied in a thickness of 0.3 to 2 mm.

What we claim is:

1. A conductor rail comprising a load-bearing body of aluminum or an aluminum alloy, and a preformed layer of steel having a thickness of at least 0.3 millimeter metallically united to said body on the part of the rail to which electrical contact is to be made during use thereof, said metal uniting establishing electric conductivity between said layer and body.

2. The conductor as claimed in claim 1, further comprising an intermediate layer between said body and said preformed steel layer, said intermediate layer comprising a material adherent to both said body and said steel sheet and also being resistant to the diffusion of steel.

* * * * *